United States Patent
Sjostrand

[19]

[11] Patent Number: 6,016,200

[45] Date of Patent: Jan. 18, 2000

[54] METHOD AND AN APPARATUS FOR DETECTING TOPPLED PACKAGES LYING ON A CONVEYOR

[75] Inventor: Uno Sjostrand, Flyinge, Sweden

[73] Assignee: Tetra Laval Holdings & Finance S.A., Pully, Switzerland

[21] Appl. No.: 09/116,927

[22] Filed: Jul. 17, 1998

[30]   Foreign Application Priority Data

Jul. 28, 1997 [SE]  Sweden ................................. 9702809

[51] Int. Cl.⁷ .................................................. B65G 43/08
[52] U.S. Cl. ........................................ 356/375; 209/525
[58] Field of Search .............................. 356/375; 209/525

[56]   References Cited

U.S. PATENT DOCUMENTS

| | | | |
|---|---|---|---|
| 4,421,542 | 12/1983 | Poad et al. | 209/525 |
| 4,542,296 | 9/1985 | Kleinnibbelink | 356/237.2 |
| 5,531,310 | 7/1996 | Itoh . | |

FOREIGN PATENT DOCUMENTS

| | | |
|---|---|---|
| 0 565 019 | 10/1993 | European Pat. Off. . |
| 1128248 | 1/1957 | France . |
| 2243227 | 3/1974 | Germany . |
| 343552 | 3/1972 | Sweden . |

OTHER PUBLICATIONS

Derwent's Abstract, No. 85–29933/05, week 8505, Abstract of SU, 1097540 (Veinberg VYA), Jun. 15, 1984.

*Primary Examiner*—Richard A. Rosenberger
*Attorney, Agent, or Firm*—Burns, Doane, Swecker & Mathis, L.L.P.

[57]   ABSTRACT

The invention relates to a method and an apparatus for detecting toppled packages (2) lying on a conveyor (1). The apparatus includes two pairs of photocells, an upper (4) and a lower (5), disposed as transmitter and receiver of a light beam (6). The photocell pairs (4, 5) are placed on either side of the conveyor path (1) so that the light beam (6) bisects the conveyor path (1) at a certain angle. The apparatus also includes a magnet valve (16) and a device (1) for removing a toppled package (2). The lower photocell pair (5) transmits, when the light beam (6) is broken, a signal to the upper photocell pair (4) which, when the light beam (6) is unbroken, transmits a signal to the magnet valve (16). The magnet valve (16) activates the device (10) which, for example, consists of an air nozzle (11), so that the toppled package (2) is blown off from the conveyor (1).

11 Claims, 3 Drawing Sheets

A - A

METHOD AND AN APPARATUS FOR DETECTING TOPPLED PACKAGES LYING ON A CONVEYOR

TECHNICAL FIELD

The present invention relates to a method for detecting toppled packages lying on a conveyor, where the packages pass two pairs of photocells, one upper and one lower, each pair constituting a transmitter of a light beam and a receiver of the light beam.

The present invention also relates to an apparatus for detecting toppled packages lying on a conveyor, the apparatus being connected to a d.c. current source and comprising two pairs of photocells, one upper and one lower, each pair being disposed such that the one photocell constitutes a transmitter and the other a receiver, and that a light beam is transmitted between each pair, the photocells being placed at the conveyor such that the light beams between each respective pair bisect the path of the conveyor at a certain angle.

BACKGROUND ART

Packages of the single-use disposable type, for example those which are produced from a continuous material web of a laminate with paper or paperboard and various layers of thermoplastic are, once they have been filled with their intended contents, to be transported further on a conveyor. From the filling machine, one or more conveyors are disposed to convey the packages further, possibly to additional machines for providing the packages with drinking straws, for packing them in multipacks or the like. When the individual packages are on their way to such a distribution machine, it may happen that they topple over, in particular if the package is tall, with a relatively slight bottom surface area. When they reach the distribution machine, toppled packages lying on the conveyor are a source of disruption to its operation, and occasion stoppage of infeed into the machine. In addition to the machine stoppage, a toppled package may jam so that damage occurs both to the toppled package itself and to packages following behind.

Toppled packages lying on the conveyor must thus be raised to the upright position or be removed from the conveyor. The commonest method of remedying the problem of packages lying down on a conveyor is to remove them from the conveyor. In such instance, there are both mechanical and electronic package traps. The mechanical traps function in that the lower support rail is removed along a certain section of the conveyor so that the passing packages on this section of the conveyor are forced out towards the support rail. The packages lying down which then have no support from the upper support rail fall out from the path of the conveyor. These mechanical package traps can, however, cause narrow and tall packages to turn about standing up on the conveyor and then instead give rise to another problem.

The electronic package traps normally consist of two pairs of photocells which are coupled in such that differences in the signals of the two pairs indicate a package lying down. A sound or light signal is emitted, whereupon the package lying down may be manually righted or removed from the conveyor. These electronic package traps are controlled from the distribution machine to which the package is being conveyed. Alternatively, they are controlled from the filling machine from which the package departs. Since the distance between these machines may be large, this involves long cable-laying. In addition, there must be room in the control system of the machine with available cable outputs. If there is not enough room, an additional control module is necessary and this involves higher costs.

OBJECTS OF THE INVENTION

On object of the present invention is to realise a method and an apparatus for detecting toppled packages lying down on conveyor, which is wholly automatic and, in that it possesses its own intelligence, reduces the number and length of wiring in an installation.

A further object of the present invention is, by means of the method and the apparatus, to obtain a detection of toppled packages lying down on the conveyor, with subsequent removal from the conveyor, which is both simple and reliable.

SOLUTION

These and other objects have been attained according to the present invention in that the method of the type described by way of introduction has been given the characterizing feature that the lower pair, when the lower light beam is broken, emits a signal to the upper pair which, when the upper light beam is unbroken, emits a signal to a magnet valve, the magnet valve actuating a device for removal of the fallen package from the conveyor.

The apparatus of the type described by way of introduction has been attained in that the apparatus also includes a magnet valve which is operative to be activated by the upper photocell pair, as well as a device for removal of a fallen package, disposed to be activated by the magnet valve.

Preferred embodiments of the present invention have further been given the characterizing features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings, in which.

DESCRIPTION OF PREFERRED EMBODIMENT

Figure 1:
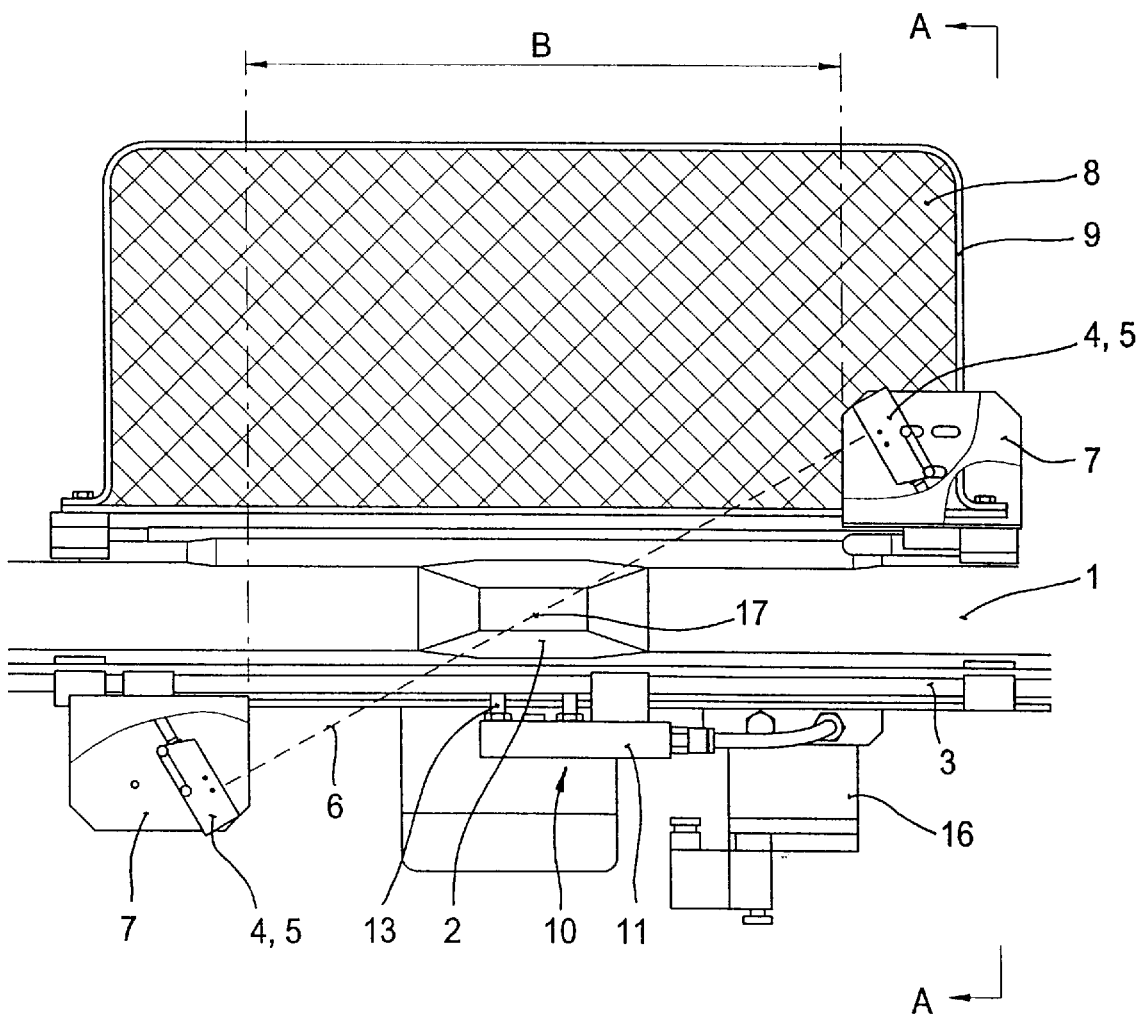
FIG. 1 is a top plan view of the apparatus according to the present invention.
Figure 2:
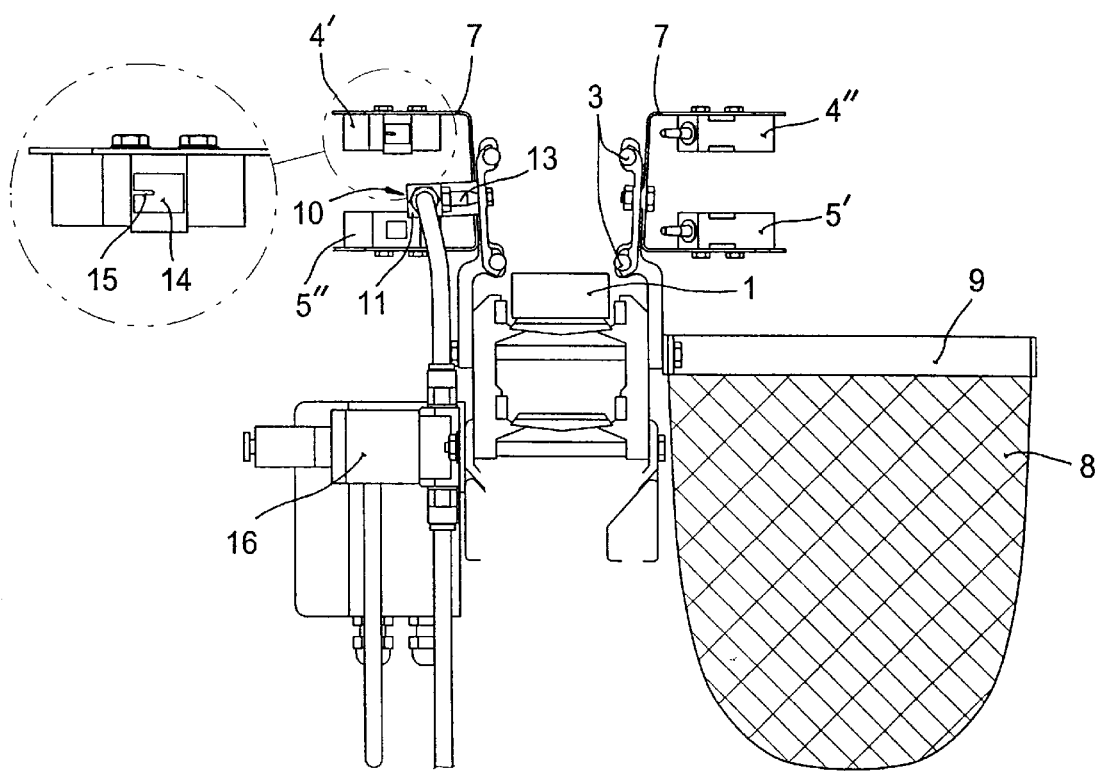
FIG. 2 is a side elevation taken along the line A—A of the apparatus according to the present invention.

FIGS. 1 and 2 show an apparatus according to the present invention placed at a section of a conveyor 1 intended to convey packages 2 which may be of parallelepipedic configuration, or alternatively as shown in FIG. 1, a prismatic configuration. The conveyor 1 may, for example, be placed somewhere between a filling machine where the package 2 is filled and formed, and a distribution machine where the package 2 may, for example, be provided with a drinking straw, be packed in a tray or shrink-film wrapped together with other packages.

Apparatuses according to the present invention may be placed at strategic points along the path of the conveyor, for example where the path changes direction or level, or where it may be expected that the package 2 may, in some way, be disturbed in its transport along the conveyor path 1. An apparatus according to the invention should also be placed in connection with the infeed into the distribution machine so that it will be certain that all packages 2 reach the distribution machine standing upright. Fallen packages 2 in a distribution machine inevitably cause operational disruption in that the distribution machine stops and the fallen packages 2 may jam and causes damage to following packages 2.

On both sides, the conveyor 1 is provided with support rails 3, most often an upper and a lower rail. Where the apparatus according to the present invention is placed, the support rail 3 is removed a distance along one side of the conveyor 1.

The apparatus comprises two pairs of photocells 4, 5, an upper pair 4 and a lower pair 5. Each pair 4, 5 consists of a transmitter 4', 5' of a light beam 6 and a receiver 4", 5" of the light beam 6. In FIG. 1, the light beam 6 is marked as a broken line. The photocell pairs 4, 5 are placed in their intended brackets 7, the brackets 7 being mounted on the support rail 3 of the conveyor 1. The photocell pairs 4, 5 are placed on either side of the conveyor path 1, so that the light beam 6 from each respective photocell pair 4, 5 bisects the conveyor path 1 at a certain angle. The angle at which the light beam bisects the conveyor path 1 may be varied and depends upon the distance B between the photocell pairs 4, 5.

The photocell pairs 4, 5 are placed on either side of the conveyor path 1 so that the transmitter 4' in the one pair is to be found on one side of the conveyor path 1 and the transmitter 5' in the other pair on the other side of the conveyor path 1. This is in order that the light beams 6 of the two pairs 4, 5 will not disturb each other.

The transmitters 4', 5' in each photocell pair 4, 5 continuously emit a light beam 6 when the apparatus is in operation and possible adjustments of the photocells 4, 5 are made on the receiver 4", 5".

Along that section where the support rail has been removed, there is disposed a device for entrapping packages 2 which are removed from the conveyor 1. In the preferred embodiment, the entrapment device consists of a net 8 stretched on a bracket 9.

The apparatus also includes a magnet valve, the magnet valve 16 being disposed to be controlled by a signal from the upper photocell pair 4 and which in turn is disposed to control a device 10 for removing a fallen package 2. In the preferred embodiment of the present invention, the device 10 for removing packages consists of an air nozzle 11 connected to a source of compressed air. The air nozzle 11 is, according to valid safety regulations, noise suppressed and safe for personnel. The air nozzle 11 is placed at that side of the conveyor 1 which still has the support rail 3 in position and approximately in register with a point 17 where the light beams 6 from the photocell pair 4, 5 bisect the conveyor path 1. The exact placing of the air nozzle 11 in relation to the point of bisection 17 depends upon the speed of the conveyor 1.

The apparatus according to the present invention has its own "intelligence" and is powered with a control current which, for example, may be 24 V DC. This current source (not shown) may be a separate power source, but current may also be obtained from the most proximal electric installation in the plant and no long and expensive wiring is required. Nor need the apparatus have any space in the control system of connected machines, but constitutes a self-contained unit.

When a package 2 which stands on the conveyor path 1 passes the photocell pair 4, 5, the light beam 6 is broken between the lower pair 5, and the receiver 5" in this pair emits a signal to the receiver 4" of the upper photocell pair. If the light beam 6 between the upper pair 4 is also broken, this implies that the upper photocell pair 4 "sees" the package 2. The package 2 is thus standing upright and no signal is emitted from the receiver 4" in the upper photocell pair.

Figure 3:
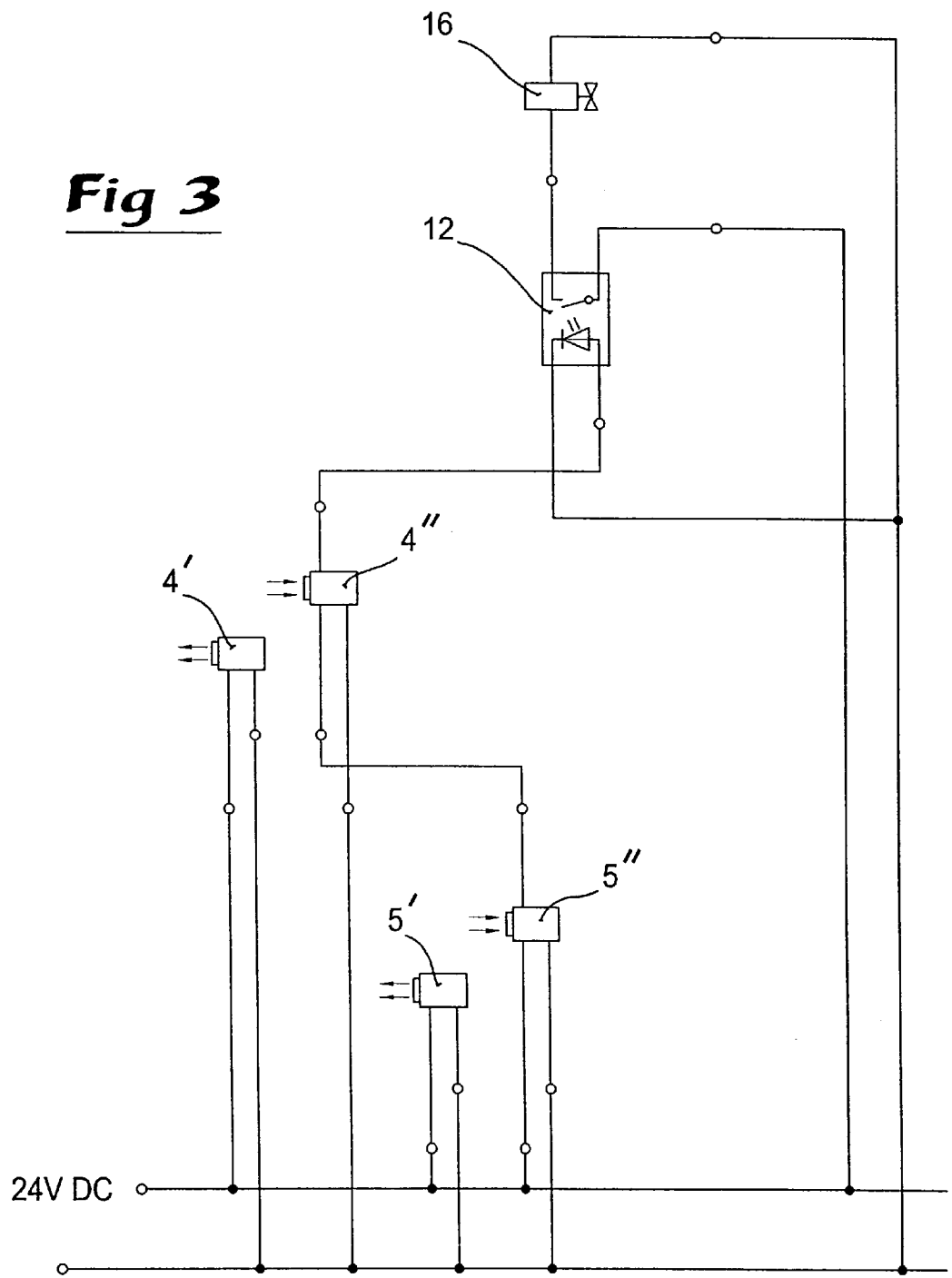
FIG. 3 is a coupling diagram for the apparatus according to the present invention.

If a fallen package 2 lying on the conveyor path 1 passes the apparatus, the light beam 6 between the lower photocell pair 5 is broken and the receiver 5" in this pair emits a signal to the receiver 4" in the upper pair. Since the package 2 has fallen and is lying down on the conveyor, the light beam 6 between the upper photocell pair 4 will remain unbroken and the upper receiver 4" will emit a signal to the magnet valve 16 of the apparatus. Depending upon the type of magnet valve 16, the signal may either pass direct to the magnet valve 16 or, as shown in FIG. 3, via an optoswitch 12.

The magnet valve 16 is activated and when this, in the preferred embodiment, is coupled to an air nozzle 11 connected to the compressed air source, the nozzle 11 begins to blow air towards the fallen package 2. The nozzle 11 may be split into one or more blowpipes 13. In the preferred embodiment, the blowpipes 13 are two in number in order better to distribute the air current and obtain an air current which effectively blows the package 2 away from the conveyor path 1. Alternatively, the magnet valve 16 may be coupled to an arm which mechanically moves in towards the conveyor path 1 and knocks the package away from the conveyor 1.

When the fallen package 2 has been removed from the conveyor 1, the lower photocell pair 5 will once again have an unbroken light beam between them and the magnet valve 16 is deactivated and the air nozzle 11 stops blowing air towards the conveyor path 1.

The distance B between the photocells in each pair 4, 5 must be so great that the package 2 will have time to be removed from the conveyor 1 before striking or jamming against the support rail 3 where this begins again along the conveyor, or in the bracket 7 for the photocells 4, 5. The distance B between the two photocell pairs 4, 5 may therefore vary depending upon the speed of advancement of the conveyor 1.

Outside the conveyor 1, some form of device for catching the package 2 suitably be provided. If the package 2 falls on the floor or against some other hard substrate, it may be damaged and be unusable. Since the device for catching the packages is, in FIGS. 1 and 2, designed as a net 8 stretched in a bracket 9, the packages 2 which are removed from the conveyor 1 will fall gently without being damaged. By regularly picking up the packages 2 out of the net, it is possible to re-set them on the conveyor path 1 and there will be slightly less of a loss of finished products.

In order to compensate for the fact that certain packages 2 incline somewhat when they are conveyed on the conveyor 1, the photocells 4, 5 may be blinded off with a plate 14 with a slot 15. The packages 2 may incline somewhat because of the fact that the bottom flaps on the package 2 are uneven. If the package 2 inclines slightly, but nevertheless stands on the conveyor 1, an incorrect indication may be obtained that the package 2 has toppled and is removed from the conveyor 1. By providing a plate 14 with a horizontal slot 15, the time when the photocell "sees" the package 2 will be prolonged and minor variations in the inclination of the package 2 may be compensated for.

As will have been apparent from the foregoing description, the present invention realises an apparatus for detecting toppled packages on a conveyor path, the apparatus consisting of a self-contained unit with its own intelligence and which thereby eliminated the need for expensive and complex wiring.

The apparatus also constitutes a simple and reliable package trap for avoiding the risk that toppled packages enter into a distribution machine with subsequent operational disruption and possibly damaged packages.

What is claimed is:

1. A method for detecting toppled packages, the packages lying on a conveyor that transports the packages past an apparatus, the apparatus comprising an upper pair of photocells and a lower pair of photocells, each pair of photocells comprising a light beam transmitter and a light beam receiver, the method comprising the steps of:

a) forming a connection between the lower pair of photocells and the upper pair of photocells;

b) transmitting a signal from the lower pair of photocells to the upper pair of photocells when the lower light beam is broken;

c) transmitting a signal from the upper pair of photocells to a valve actuating device when the upper light beam is broken;

d) actuating a removal device with the valve actuating device; and e) removing the fallen package from the conveyor with the removal device.

2. The method as claimed in claim 1, wherein step d) further comprises activating an air nozzle which blows the toppled package from the conveyor.

3. The method as claimed in claim 1, wherein step c) further comprises deactivating the valve as soon as the lower pair of photocells has between them an unbroken light beam.

4. The method of claim 1, wherein the valve comprises a magnetic valve.

5. An apparatus for detecting and removing toppled packages from a conveyor comprising:

a lower pair of photocells comprising a light beam transmitter and a light beam receiver;

an upper pair of photocells comprising a light beam transmitter and a light beam receiver;

a connection formed between the lower pair of photocells and the upper pair of photocells such that a first signal is emitted from the lower pair of photocells and travels via the connection to the upper pair of photocells when the lower light beam is broken;

an actuating valve adapted to be activated by an activation signal received from the upper pair of photocells; and a removal device adapted to remove toppled packages from the conveyor upon being activated by the actuating valve.

6. The apparatus as claimed in claim 5 wherein the remover device is placed in register with a point where the light beams from the photocell pairs bisect the path of the conveyor.

7. The apparatus as claimed in claim 5, wherein the remover device comprises an air nozzle connected to a compressed air source.

8. The apparatus as claimed in claim 7, wherein the air nozzle is provided with two blowpipes.

9. The apparatus of claim 5, wherein the actuating valve comprises a magnetic valve.

10. The apparatus of claim 5, wherein the lower and upper light beams bisect the conveyor at a predetermined angle.

11. The apparatus as claimed in claim 10, wherein the predetermined angle at which the light beams bisect the conveyor depends upon the distance between the photocell pairs, and that said distance is adapted to the speed of the conveyor.

* * * * *